(12) United States Patent
Schlabach

(10) Patent No.: US 9,541,229 B2
(45) Date of Patent: Jan. 10, 2017

(54) HYDRO-FORMED T-FITTING

(71) Applicant: NIBCO INC., Elkhart, IN (US)

(72) Inventor: John W. Schlabach, Lyndhurst, VA (US)

(73) Assignee: NIBCO INC., Elkhart, IN (US)

( * ) Notice: Subject to any disclaimer, the term of this patent is extended or adjusted under 35 U.S.C. 154(b) by 309 days.

(21) Appl. No.: 13/947,184

(22) Filed: Jul. 22, 2013

(65) Prior Publication Data

US 2013/0300105 A1 Nov. 14, 2013

Related U.S. Application Data

(62) Division of application No. 12/883,658, filed on Sep. 16, 2010, now Pat. No. 8,511,124.

(60) Provisional application No. 61/243,563, filed on Sep. 18, 2009.

(51) Int. Cl.
F16L 13/14 (2006.01)
F16L 41/02 (2006.01)
B21D 26/037 (2011.01)

(52) U.S. Cl.
CPC ........... F16L 41/021 (2013.01); B21D 26/037 (2013.01)

(58) Field of Classification Search
CPC ... B21D 26/033; B21D 26/037; B21D 26/043; B21D 26/053; F16L 41/021; F16L 13/14; F16L 2013/145; B21C 37/29; F16K 27/02
USPC .................................. 72/58, 61, 62
See application file for complete search history.

(56) References Cited

U.S. PATENT DOCUMENTS

| 633,971 | A | | 12/1899 | Griffiths |
| 2,203,868 | A | * | 6/1940 | Gray et al. ........................ 72/58 |
| 2,238,037 | A | * | 4/1941 | Cornell, Jr. ....................... 72/58 |
| 2,949,875 | A | | 8/1960 | Adams |
| 2,952,070 | A | * | 9/1960 | Veatch .................... B21C 37/29 29/890.148 |
| 2,971,250 | A | | 2/1961 | Wahlin |
| 3,685,547 | A | * | 8/1972 | Tuppeny, Jr. ........... F16K 27/00 138/178 |
| 3,843,055 | A | | 10/1974 | Nord et al. |
| 5,107,693 | A | | 4/1992 | Olszewski et al. |
| 6,029,487 | A | * | 2/2000 | Genin et al. ...................... 72/58 |
| 6,266,986 | B1 | | 7/2001 | Morita et al. |
| 6,282,934 | B1 | * | 9/2001 | Bikert et al. ..................... 72/58 |
| 6,301,765 | B1 | | 10/2001 | Arns et al. |
| 6,591,650 | B2 | | 7/2003 | Engel et al. |
| 6,675,621 | B2 | | 1/2004 | Kleber |
| 7,337,641 | B1 | * | 3/2008 | Bruggemann ................... 72/58 |
| 8,251,302 | B2 | | 8/2012 | Sloan, Jr. |
| 2005/0166382 | A1 | * | 8/2005 | Bruggemann ............... 29/421.1 |
| 2006/0284423 | A1 | * | 12/2006 | Katsuno ................ A61M 39/10 285/417 |

FOREIGN PATENT DOCUMENTS

FR 1079811 A * 12/1954 ............. F16K 27/02
GB 467262 A * 6/1937 ............. F16L 41/021

* cited by examiner

Primary Examiner — Edward Tolan
(74) Attorney, Agent, or Firm — Price Heneveld LLP

(57) ABSTRACT

A punch for forming opposite ends of a copper tube into a T includes a tapered or shovel-nose such that the spacing between the ends of the opposed punches is reduced, thereby reducing the excess copper remaining in the T once formed. A method of forming the fitting employs the shovel-nose punches in a hydro-forming process to accommodate such results.

5 Claims, 5 Drawing Sheets

HYDRO-FORMED T-FITTING

CROSS-REFERENCE TO RELATED APPLICATIONS

This application is a divisional of U.S. application Ser. No. 12/883,658, entitled T-FITTING MANUFACTURING METHOD AND TOOL, filed Sep. 16, 2010, which claims priority under 35 U.S.C. §119(e) of U.S. Provisional Application No. 61/243,563 entitled T-FITTING MANUFACTURING METHOD AND TOOL, filed on Sep. 28, 2009, by John W. Schiabach, the entire disclosures of which are incorporated herein by reference.

BACKGROUND OF THE INVENTION

The present invention relates to the manufacturing of copper T-fittings.

FIG. 1 shows a diagram of prior art T-fittings manufactured by a hydro-forming process utilizing generally cylindrical end punches, as seen in the prior art manufacturing equipment of FIG. 12. The punches move toward one another and engage a copper tube to compress the copper tube to form the orthogonal T-extension. The process includes the subsequent steps of cutting the end of the extending orthogonal section and sizing all three openings of the T for final dimensioning. With prior art processes and tooling, however, a relatively large amount of copper remains in the T at a position opposite the opening of the orthogonal T, as shown by arrow C in FIG. 1. In view of the increasing cost of copper, this material, which does not provide a useful function to the T itself, is an unnecessary cost to the final product.

There exists a need, therefore, for a T-fitting design and manufacturing process in which the unnecessary material is eliminated while still employing the hydro-forming process.

SUMMARY OF THE INVENTION

The present invention reduces the amount of copper in a T-fitting by from 20% to 12% by providing a punch for forming opposite ends of a copper tube into a T, which includes a tapered or shovel-nose such that the spacing between the ends of the opposed punches is reduced, thereby reducing the excess copper remaining in the T once formed. The invention involves both a method of forming the fitting employing the shovel-nose punches in a hydro-forming process, the shape of the punch nose to accommodate such results, and the resultant fitting.

These and other features, objects and advantages of the present invention will become apparent upon reading the following description thereof together with reference to the accompanying drawings.

DETAILED DESCRIPTION OF THE PREFERRED EMBODIMENT

Figure 1:
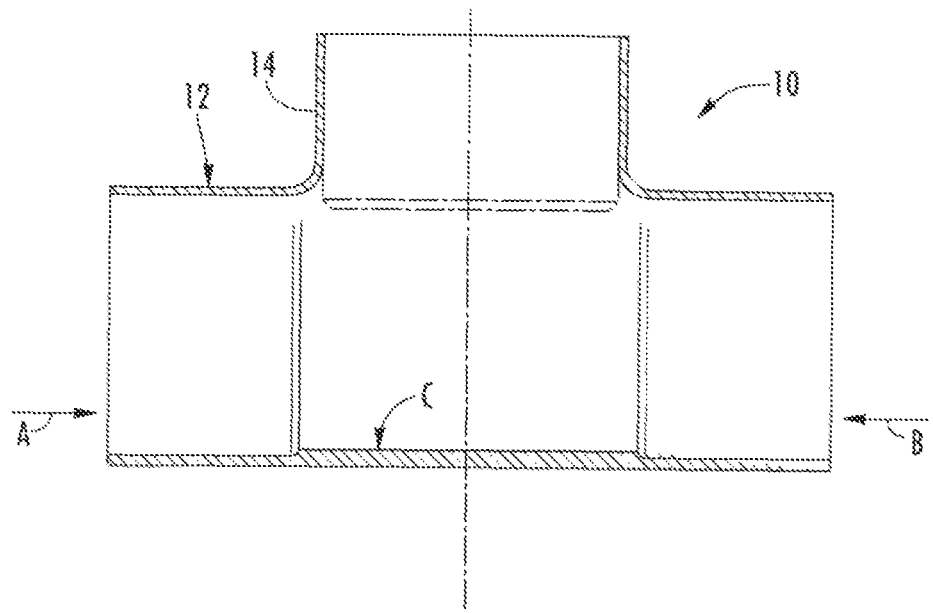
FIG. 1 is a cross-sectional view of a conventional T-fitting manufactured according to the prior art.
Figure 2:
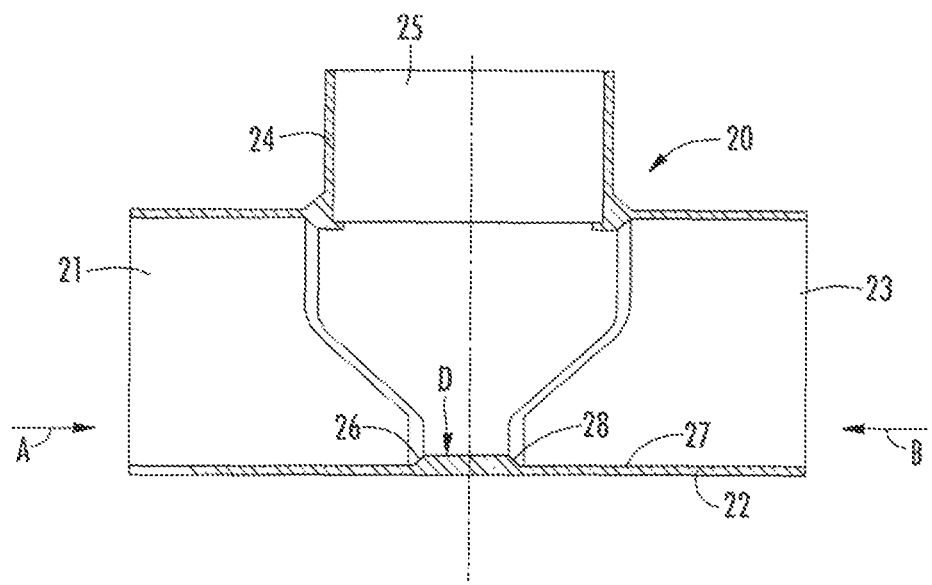
FIG. 2 is an improved T-fitting manufactured according to the present invention utilizing the tooling of the present invention.

Referring initially to FIG. 1, there is shown a conventional T-fitting 10 in which a copper tube is formed by compressing under water at high pressure (about 10,000 psi) utilizing cylindrical punch noses compressing a straight section of cylindrical copper pipe in opposite directions indicated by arrows A and B in FIGS. 1 and 2. The result is a domed cylindrical orthogonal T-extension 14 (FIG. 12) to the otherwise cylindrical pipe 12. The enclosed end of domed extension 14 is cut in a second step, after which each of the three open ends is sized in a sizing guide to form the finished product. The cylindrical punches are inserted in the pipe in opposite directions as indicated by arrows A and B, however, resulting in a buildup of copper in the area indicated by arrow C in FIG. 1. This extends substantially the width of the of the diameter of the T-section 14. This buildup of copper material provides no additional strength or functional value to the T-fitting 10 and represents a waste of material.

In order to reduce the excess material in area C (FIG. 1), a new fitting 20 has been devised utilizing improved punch noses shown in FIGS. 4-11. In fitting 20, a straight cylindrical section of copper tube 22 is again formed into a T by utilizing the shovel-nose punches 50 of the configuration shown in FIGS. 4-11 in the hydro-forming equipment of FIG. 12 instead of the standard cylindrical prior art punch noses. The process takes place in a hydro-forming machine at a high pressure of about 10,000 psi. The utilization of the shovel or tapered punches results in a much smaller buildup of copper in the area shown by arrow D in FIG. 2, which results in a 10% to 12% copper savings for the T-fitting 20 as compared to the T-fitting 10 for a given diameter fitting.

Figure 3:
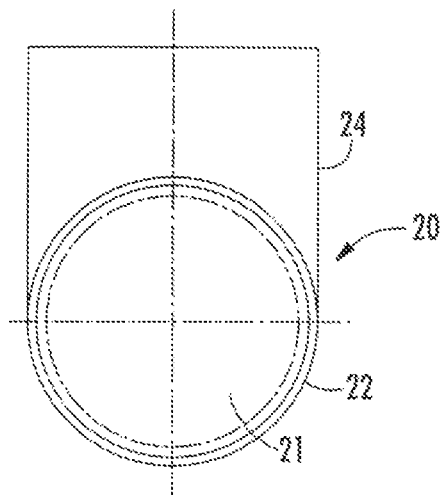
FIG. 3 is a left end view of the fitting shown in FIG. 2.
Figure 4:
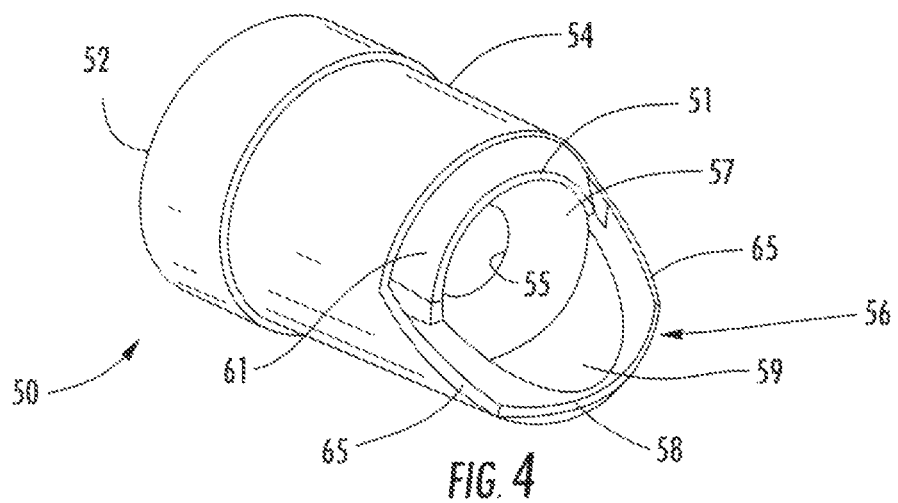
FIG. 4 is a perspective view of one of the punch noses employed for compressing opposite ends of a copper pipe to form the T-fitting shown in FIGS. 2 and 3.
Figure 12:
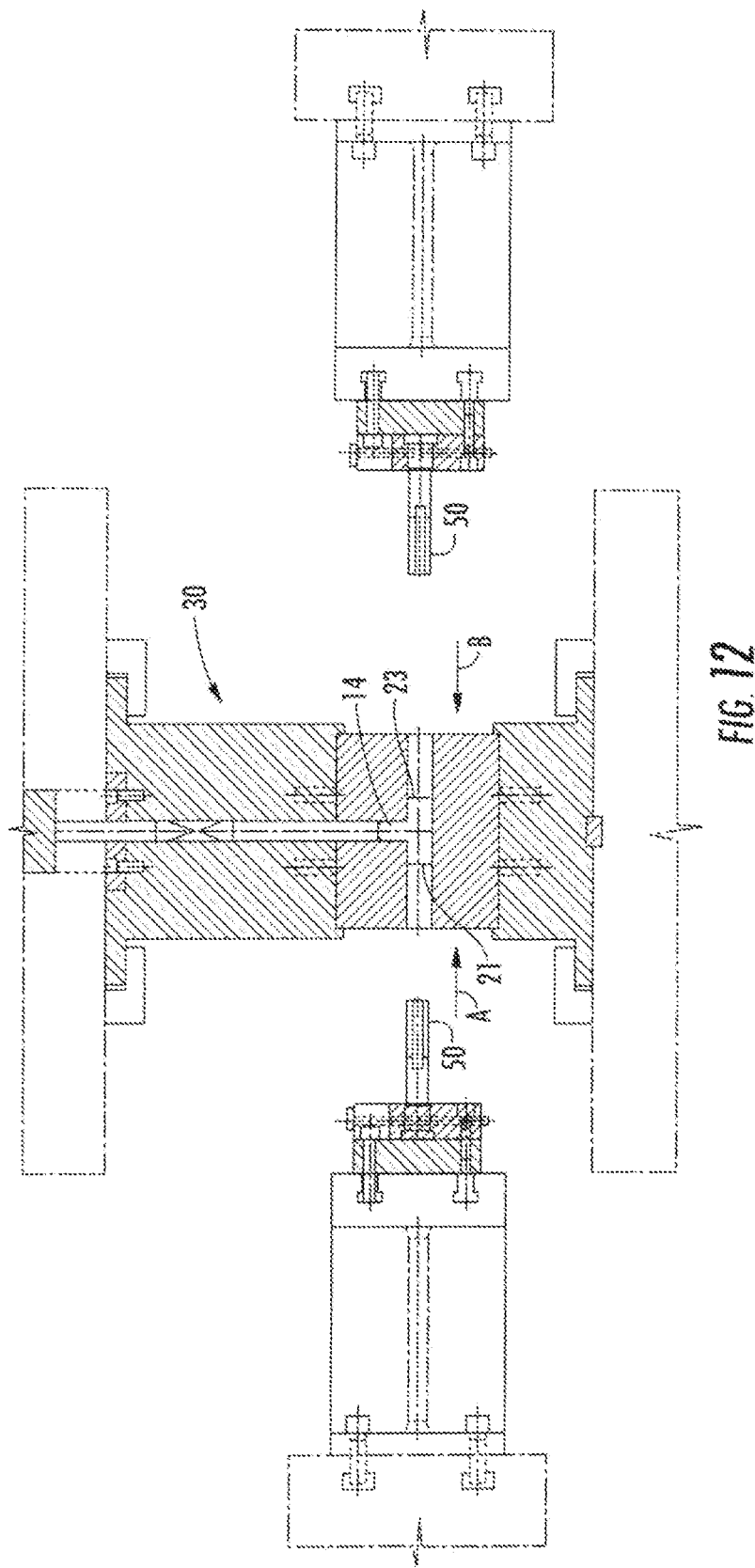
FIG. 12 is a schematic view of the prior art hydro-forming press.

The method of manufacturing "T" 20 involves three steps, the first step being placing a copper tube of a diameter ⅛" to about 4" and having a length slightly longer than the desired final length of the T in a pair of dies in a hydro-forming machine. The lower die is semi-cylindrical and an upper die has the same shape but has a cylindrical opening to allow the projection 24 of fitting 20 to extend through the top die. Punches 50 are pushed in opposite ends to force the ductile copper (which is from 95% to 99% pure) through the opening in the upper die forming an extension 14 which, after the first step, is capped with a copper dome. The partially formed T is then removed from the hydro-forming press, which can be a press that is commercially available from Schuler, such as shown in FIG. 12, and placed in a second die, which provides an alignment slot and chisel-like knife for slicing the domed end of projection 24 off, forming the open end 25 of the T, which also includes open ends 21 and 23, as seen in FIGS. 2 and 3. Finally, a finishing step is provided by placing the T-fitting 20 in a final die with three punches entering each of the openings 21, 23, and 25 to provide the final sizing and dimensions for receiving corresponding pipes in a plumbing system.

As can be seen by comparing FIGS. 1 and 2, a significant percentage of copper is saved by reducing the amount of copper shown by arrow C in FIG. 1 to a significantly smaller amount, as shown by arrow D in FIG. 2. The reduction in the amount of copper in that particular area can be as much as 300% or more and represents an overall copper savings for the T-fitting of from 10% to 12%. The ability to manufacture fitting 20 as shown in FIGS. 2 and 3 is achieved by the shape of the shovel-nose punch 50 shown in FIGS. 4-11. One such punch is used at each of the open ends 21 and 23 (FIG. 2) by the hydro-forming machine 30 (FIG. 12).

Figure 5:
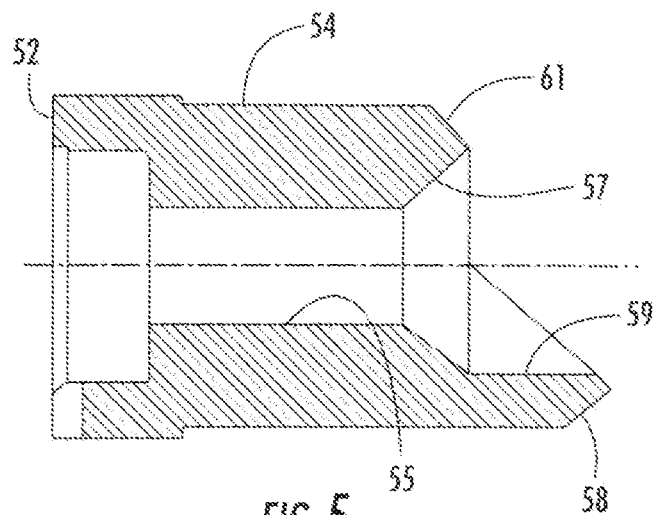
FIG. 5 is a cross-sectional view of the punch nose.
Figure 6:
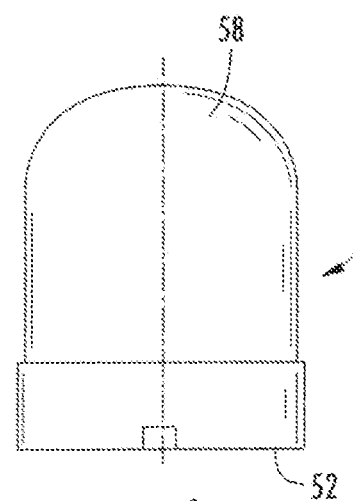
FIG. 6 is a bottom view of the punch nose.
Figure 7:
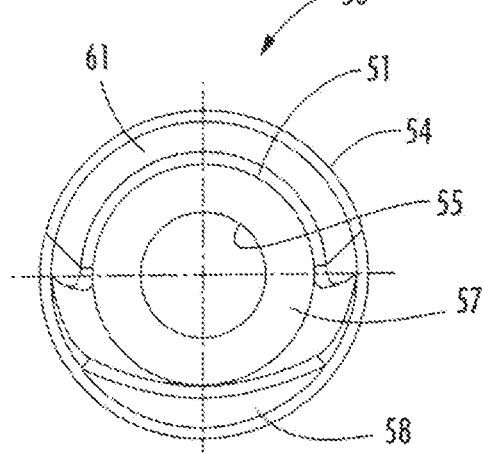
FIG. 7 is a front elevational view of the punch nose.
Figure 8:
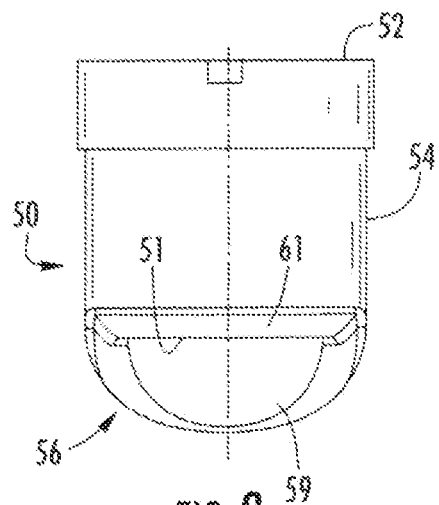
FIG. 8 is a top view of the punch nose.
Figure 9:
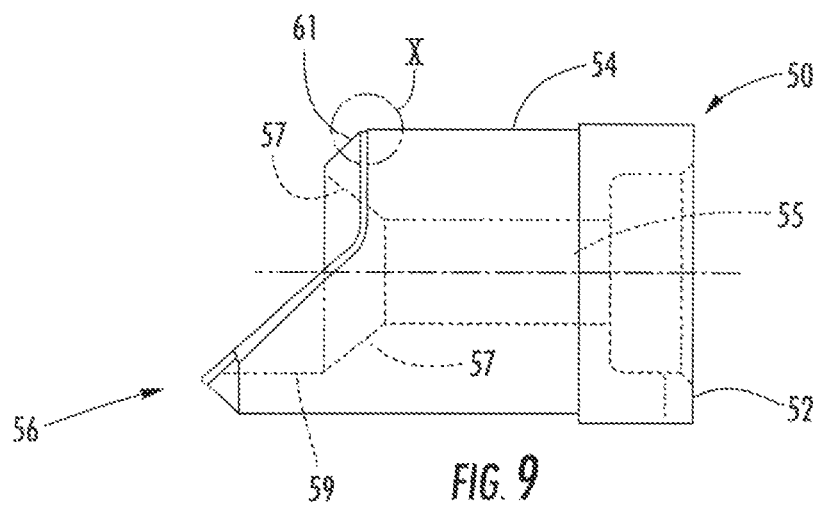
FIG. 9 is a side elevational view, partly in phantom, of the punch nose.
Figure 10:
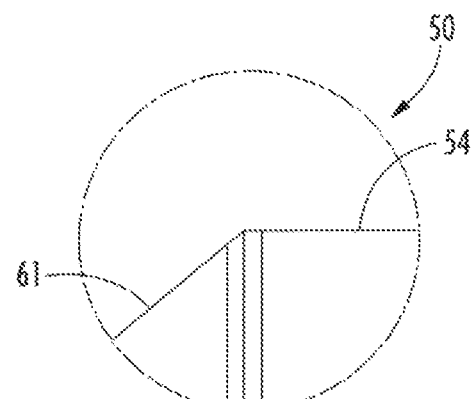
FIG. 10 is an exploded fragmentary view taken in the circled area X in FIG. 9.
Figure 11:
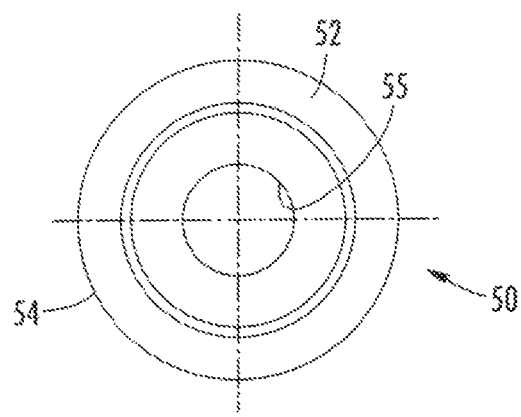
FIG. 11 is a right end elevational view of the punch nose.

Punch 50 includes a first end 52 which is coupled to a source of pressurized fluid, such as water, at a pressure of 10,000 pounds or the like and has a generally cylindrical body 54 terminating in a shovel-nosed end 56. A cylindrical longitudinally extending passageway 55 allows water to pressurize the internal volume of the copper pipe placed in the hydro-forming press. The end 56 includes a lower tapered lip 58 (tapered at about 45°) extending forwardly and concavely curved through an arc of approximately 120°. Lip 58 is tapered upwardly to the opening 55 by a tapered conical transition zone 57 and lead-in zone 59. Zone 57 circumscribes an arc of about 82° (FIG. 5). The top 51 of the shovel-nose punch is also tapered at 61 at about 45° to form a semi-conical surface.

The hydro-forming machine uses two identical punches 50 with one on each end and the shovel-nosed ends 58 align with the lower section 27 (FIG. 2) of the fitting 20 during the forming process, such that the edges 58 of the punch form the edges 26 and 28 of the copper shown by arrow D in FIG. 2. By providing an outwardly projecting nose 56 and the angled end defined by side walls 63 and 65 terminating in the upper annular end 51 (FIGS. 4, 7, and 8) allows the shovel-nose design of punch 50 when used in a hydro-forming process to form the fitting shown in FIGS. 2 and 3 with a reduced amount of excess copper, thereby greatly reducing the cost of the fitting itself and yet providing the same high quality T-fitting available with the prior art processes. The dimensions of the punch 50 are proportionally varied depending on the size of T-fitting 20 being manufactured, although the shovel-nose shape remains substantially as shown.

It will become apparent to those skilled in the art that the exact shape of the punch nose may be varied, as will the dimensions for different size T-fittings, without departing from the spirit or scope of the invention as defined by the appended claims.

The invention claimed is:

1. A copper T-fitting comprising:
a first leg and a second leg extending orthogonally from said first leg and wherein said fitting is made using hydro-forming with a shovel-nose punch shaped to reduce the amount of copper in the area of said first leg adjacent to and on opposite sides of the axis of intersection of said second leg with said first leg, wherein said punch has a generally cylindrical body having a central aperture for supplying high pressure fluid to a copper pipe, wherein said tapered punch has a cylindrical passageway terminating in an end having a tapered and concavely curved lip extending outwardly from said body, said punch including a tapered top on a side of said cylindrical passageway opposite said concavely curved lip; and a conical transition zone extending between said concavely curved lip and said tapered top.

2. A T-fitting made by the process comprising the steps of:
inserting a copper tube in a hydro-forming die; and
applying a shovel-nose tapered punch to opposite ends of said tube to hydro-form a T-fitting having a first leg and a second leg orthogonal to said first leg wherein said first leg has a reduced amount of copper in the area facing outer edges of said second leg, wherein said punch has a generally cylindrical body having a fluid passageway with a longitudinal axis, said passageway for receiving pressurized water, and said body having a curvilinear end configured to include a curved tapered lip extending longitudinally forwardly of said body through an arc less than 180°, wherein said curved tapered lip has an upper surface proximate said axis of said passageway and a lower end which is remote from said axis of said passageway which lower end is tapered in a direction opposite said upper surface.

3. The T-fitting as defined in claim 2 wherein said fitting is made by the process of inserting a copper tube in a hydro-forming die, and applying said shovel-nose tapered punches to opposite ends of said tube to form a T-fitting having a first leg and a second leg orthogonal to said first leg wherein said first leg has a reduced amount of copper in the area forming said second leg.

4. The fitting as defined in claim 1 wherein the amount of copper in the area of said first leg adjacent to and on opposite sides of the axis of intersection of said second leg with said first leg is reduced by about 300%.

5. The fitting as defined in claim 2 wherein the amount of copper in the area facing outer edges of said second leg is reduced by about 300%.

* * * * *

UNITED STATES PATENT AND TRADEMARK OFFICE
CERTIFICATE OF CORRECTION

PATENT NO. : 9,541,229 B2  
APPLICATION NO. : 13/947184  
DATED : January 10, 2017  
INVENTOR(S) : Schlabach Page 1 of 1

It is certified that error appears in the above-identified patent and that said Letters Patent is hereby corrected as shown below:

In the Specification

Column 1, Line 11, "Schiabach" should be --Schlabach--; and

Column 1, Line 40, "20%" should be --10%--.

Signed and Sealed this
Fourth Day of April, 2017

Michelle K. Lee
*Director of the United States Patent and Trademark Office*